Jan. 1, 1963  W. J. METZGER  3,071,256
TRANSITIONAL COUPLING DEVICE
Filed Aug. 29, 1960  2 Sheets-Sheet 1

INVENTOR.
WILLIAM J. METZGER
BY Henry Kozak
ATTORNEY

United States Patent Office 3,071,256
Patented Jan. 1, 1963

3,071,256
TRANSITIONAL COUPLING DEVICE
William J. Metzger, East Cleveland, Ohio, assignor to National Malleable and Steel Castings Company, Cleveland, Ohio, a corporation of Ohio
Filed Aug. 29, 1960, Ser. No. 52,683
7 Claims. (Cl. 213—112)

The present invention relates to a coupling device suitable for coupling the railway vehicle on which it is mounted to another vehicle which may be equipped with one of a plurality of types of couplers. The present invention is particularly useful, for example, on the locomotives of track systems wherein some of the cars are equipped with a different type of coupler than other cars. Usually this situation is present in a system wherein a gradual rather than a rapid transition from one type of equipment to another is being effected in order that a reasonable service life may be realized on the equipment being replaced. It is usually desirable to equip some of the cars, as well as the locomotives with a transitional coupling device, such as the coupling mechanism herein described, in order that mixed trains may be formed.

A principal object of this invention is to provide a transitional coupling device comprising an automatic coupler head as one of the coupling means, and to mount the automatic coupler head on fold-down structure which a trainman may easily transfer between operative and inoperative positions.

Another object is to utilize fold-down structure for supporting an automatic coupler head which has sufficient built-in spring loading to fully support the coupler head in an upper position.

A further object is to provide fold-down structure for supporting an automatic coupler head encroaching to a minimum extent on the so-called Berne rectangle observed in the design of draw-hook side-buffer type vehicles.

In brief, the invention resides in a coupling device comprising a pair of unlike couplers connected in end-to-end tandem relationship by a pin or other means extending through overlapping end portions of both couplers. In the operative position of the device on a vehicle, that coupler attached directly to the vehicle is conventionally regarded as rearward or inward from the front or outer coupler. The rear extremity of the device, i.e., the rear end portion of the rear coupler is constructed for pivotal attachament to a vehicle. The front end portions of both couplers, i.e., the portions more remote from the vehicle, comprise coupler heads or structure for coupling with cooperating coupling structure of other vehicles. The coupling means of the frontward coupler is operative when the couplers are in a common rectilinear alignment. The coupling means of the rearward coupler becomes operative when the couplers are in a relatively angled alignment exposing the coupling means of the rear coupler for coupling.

The improvement embodied in the present invention resides primarily in counterbalancing mechanism operatively interposed between the two couplers and reacting therebetween to facilitate transfer of the front coupler between a common longitudinal alignment and an angled alignment relative to the rear coupler. In its simplest aspect, this mechanism supplies a torque force acting between the couplers about the axis of the aforesaid pin.

In the drawing with respect to which the invention is described in detail below:

Figure 1:
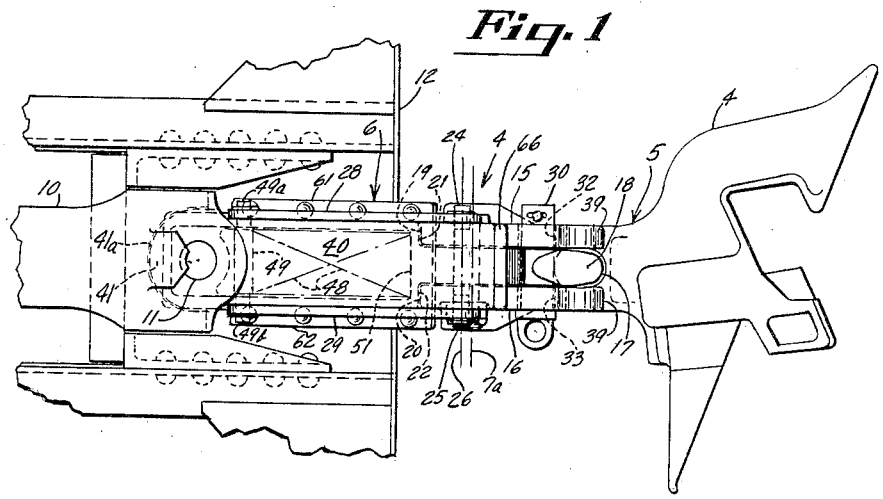
FIG. 1 is a fragmentary plan view of one embodiment of the invention including a portion of a vehicle frame, a yoke, and a coupling device incorporating the invention in normal position adapting the coupler head at the right of the figure for coupling.

Considering now the first embodiment as illustrated in FIGS. 1 to 4, the coupling device 4 comprises a front coupler 5 and a rear coupler 6 relatively pivoted with respect to a normally horizontal axis passing transversely through overlapping end portions on a pin 7. The device 4 is connected to draft gear mechanism including a yoke 10 by a vertical pin 11. The draft gear mechanism is housed within elements of the vehicle frame 9 in a manner that is merely illustrative of any conventional arrangement and hence does not require detailed description herein.

The front coupler 5 comprises a forward head portion of any desired design. The head 14 as illustrated is a typical "Willison" coupler head in extensive use for automatic coupling. The shank of the coupler 5 is longitudinally bifurcated from its rear end to form two horizontally spaced legs 15 and 16 at opposite sides of a recess 17 for receiving the front hook 18 of the rear coupler 6. The shank legs have coaxial bores aligned along the horizontal axis 7a in coaxial registry with a bore through the rear base of the hook 18. These bores receive the pin 7 and permit coupler 5 to pivot on this pin with respect to the coupler 6 in a manner hereinafter described.

The shank legs 15 and 16 terminate rearwardly in semicylindrical surfaces 19 and 20 which function as buffing surfaces when engaged by complementary concavely semicylindrical abutment surfaces 21 and 22 of the rear coupler 6.

Figure 2:
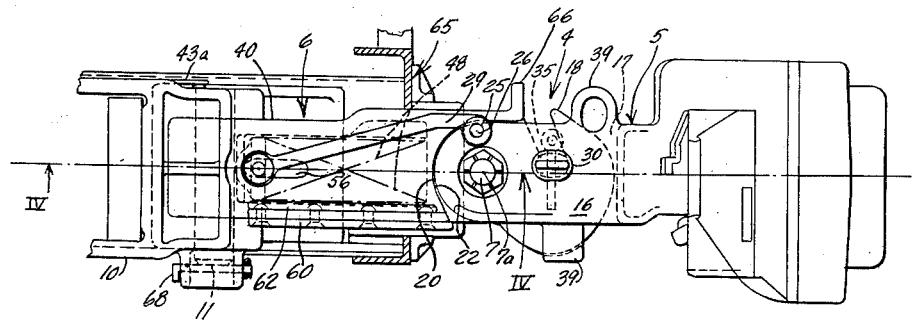
FIG. 2 is a side elevation of the structure shown in FIG. 1 as positioned therein.

The front coupler 5 is further provided with coaxial trunnions 24 and 25 disposed along axis 26. This axis, as shown, extends through the rearward portions of the legs 15 and 16 in parallel spaced relation with the axis 7a. The axis 26 is also in upwardly spaced relation with the normally horizontal longitudinal plane of coupler 5 containing the axis 7a and the draft axis of this coupler. The resulting disposition of the trunnions 24 and 25 enables application of a torsion force to coupler 5 exerted thereon from coupler 6 through a pair of connecting rods 28 and 29. The coupler 5 is secured in operative position, as shown in FIGS. 1 and 2, by a pin or key 30 which extends through a pair of coaxial bores 32 and 33 disposed along an axis parallel and forwardly of the pivotal axis 7a approximately centrally of the height of the legs 15 and 16. At this raised operative position of the coupler 5, the pin 30 also passes through the lower eye portion of an upwardly opening slot 35 formed by the hook 18. The upper shank portion of the slot 35 is smaller in the longitudinal direction of the coupler than the lower eye portion to retain the pin 30 in the hook. The periphery of the eye portion agrees approximately with that of the bores 32 and 33.

Figure 3:
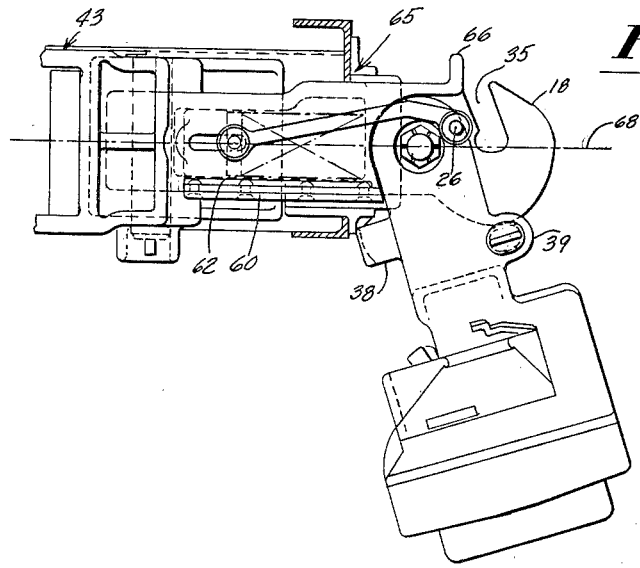
FIG. 3 is a side elevation of the structure shown in FIGS. 1 and 2 illustrating the front coupler of the coupling device in a downwardly-angled inoperative position exposing the coupling means of the rear coupler for coupling.

In inoperative position, the coupler 5 is, as shown in FIG. 3, downwardly angled with respect to coupler 6. Comparing FIGS. 1 and 2, the displacement between the operative and inoperative positions is approximately 75 degrees. A pair of bosses 38, one extending from the underside of each shank leg 15 and 16, limit angular movement of the coupler 5 by engaging vehicle structure, such as the coupler support of a striker plate, passing transversely underneath the rear coupler 6. While defining the inoperative position of the coupler 5, this stopping arrangement also limits backward pendulous movement of the coupler 5 during, e.g., impact-generated acceleration or deceleration of the associated vehicle. Forward swinging of the coupler 5 from its downward position is prevented by the pin 30 when positioned in a pair of horizontally spaced eyes 39 disposed coaxially along an axis parallel to the pivotal axis 7a, each eye being formed integrally as a portion of one of the shank legs 15 and 16 and projecting upwardly from the upper surface of its respective leg. At inoperative position of coupler 5, the pin 30 extends from eye to eye nearly in contact with the undersurface of the hook 18. Because the front surface of the hook extends forwardly and upwardly at increasing radius with respect to the main pivotal axis 7a from the undersurface engageable by the pin 38, the coupler is effectively prevented from moving forward from inoperative position.

Figure 4:
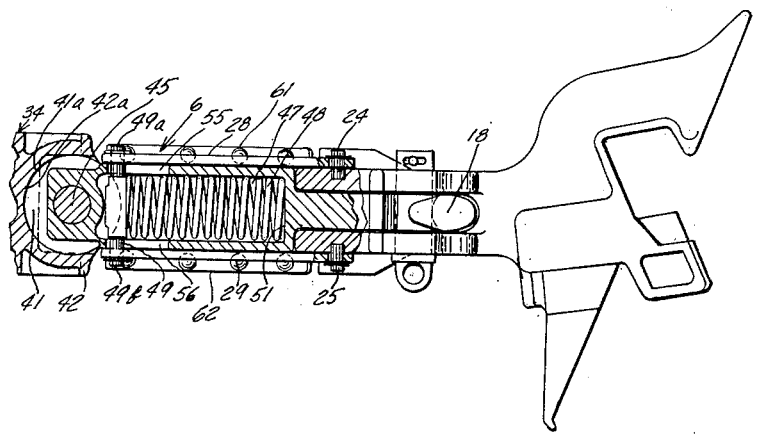
FIG. 4 is a plan view similar to FIG. 1 except for a portion in partial section along line IV—IV of FIG. 2.

The rear coupler 6 extends rearwardly from its hook 18 as a box-shaped hollow shank 40 terminating rearwardly in a pin-receiving portion 41 having a rearward-facing vertical outer convexly cylindrical surface 41a (see FIG. 4). The rear portion 41 is received in the front end portion 42 of a yoke 43 providing a concavely cylindrical surface 42a complementary to surface 41a. These surfaces transmit major buffing forces from the device 4 to the vehicle. The coupler 6 is connected with the yoke 43 by a pin 11 received in bores of the yoke and the coupler 6 in coaxial registry with the surfaces 41a and 42a, respectively. Forwardly of the cylindrical portion 41, the shank of coupler 6 has a cavity 47 occupied by a spring 48 and a follower 49. In the first embodiment, the follower is located in engagement with the rear end of the spring. Hence, the spring 47 is disposed between the follower and the front rearward facing wall 51 of the cavity.

The follower 49 comprises trunnions 49a and 49b which project from a box-shaped portion of the follower disposed within the cavity outwardly through and beyond slots 55 and 56 in the lateral walls of the shank. The slots 55 and 56 are elongated in the lengthwise direction of coupler 6 to allow movement of the follower lengthwise of the cavity 47 in compressing the spring 48. Such operation occurs when the follower is drawn forward by the connecting rods 28 and 29 in responding to downward tilting of the coupler 5. The main body of the coupler 6 is of one piece and open along the bottom of the cavity 48. A cover plate 60 for the cavity is secured underneath the coupler body to the outward extending bottom flange portions 61 and 62 of the lateral cavity walls. The plate 60 thus retains the spring and follower in the cavity and must be removed if the spring and follower are to be removed.

In the first embodiment illustrated, the upper shank wall of coupler 6 is stepped upwardly in the rearward to forward direction to provide a rearward section of smaller height to be received in the end of the yoke 43 and a higher front section conforming to the height of the coupler opening in the striker 65. Just rearward of the slot 35 of the hook 18, the coupler 6 comprises a boss 66 projecting upwardly from the top wall and functioning in place of the conventional horn of a coupler as a stop limiting rearward travel of the device relative to the vehicle.

The pin 11 is retained in respective bores provided therefor in the yoke 43 and the coupler 6 by a shelf 43a of the yoke overhanging the pin and a key 68 extending through an annular flange extension of the yoke underneath the pin.

The torque applied to the coupler 5 originating in the compressed spring 48 has two purposes: (1) to support the coupler 5 in common horizontal alignment with coupler 6, and (2) to facilitate manual movement of the coupler 5 between the operative and inoperative positions illustrated by FIGS. 2 and 3. The pin 30 is used to lock the coupler 5 in operative position and thus contributes essentially in the support of the coupler 5 at raised position. Hence, the manual effort of positioning coupler 5 is minimized when the compressive strength of the spring 48 is such as to approximately counterbalance opposing torque resulting from the weight of the coupler 5 acting about axis 7a. Thus, manual effort expended in moving the coupler 5 from one position to the other is essentially that of overcoming friction.

Torque is applied to coupler 5 by a purely tensile force transmitted through the rods 28 and 29 from the follower trunnions 49a and 49b. As the trunnions move lengthwise of a vertically centered horizontal longitudinal plane 68 of coupler 6, the effective torque producing lever length exerted on coupler 5 will be measured by the height of the axis 26 above the plane 68 since this plane also contains the axis 7a about which coupler 5 pivots. Hence, the lever arm exerted at trunnions 24 and 25 (axis 26) varies from approximately the full radial distance of axis 26 from axis 7a at raised operative position of coupler 5 (FIG. 2) to nearly zero length at the lowered inoperative position (FIG. 3) The opposing torque generated by the weight of coupler 5 reaches a maximum at the raised position of coupler 5 and a minimum at its lowered position. The opposing torque forces are thus effectively counterbalanced at any relatively angled position of the couplers.

Figure 5:
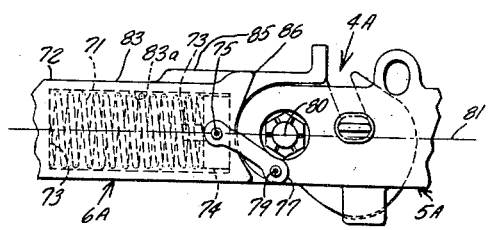
FIG. 5 is a side elevation of a modified embodiment of the invention.

A modified embodiment of the invention is illustrated in FIG. 5 which is distinguishable from the first described embodiment primarily in the mechanism for applying torque to the front coupler. In the device 4A comprising couplers 5A and 6A, the spring 71 housed within the hollow shank 72 of the rear coupler 6A stands under a condition of compression between a front-facing wall 73 at the rear end of the shank cavity and a follower 74 housed also within the cavity. The follower is located in the forward end of the cavity and has trunnions 75 (one being shown) extending through slots 76 (one being shown) in the opposite lateral walls of the shank into journal-bearing relation with short connecting rods 77 on both sides of the device 4A. The rods 77 are secured in journal-bearing relation with trunnions 79 at opposite sides of the coupler 5A in eccentric relation to the main pivotal axis 80 of the couplers. The trunnions 79 of coupler 5A (one being shown) are coaxial with respect to an axis parallel to the axis 80 and in downwardly spaced relation with a longitudinal plane 81 of the coupler 5A containing the axis 80. The upper shank wall 83 of the coupler 6A is rectilinear rather than stepped, as found in the earlier described embodiment, to provide a rectilinear bearing surface for receiving the upper end surface of the follower 74 and allowing unimpeded movement thereof within the cavity. As compared with the requirement of thickness of the follower in the first described embodiment (FIGS. 1 to 4) the thickness of the follower 74 in the longtiudinal direction of the coupler is preferably relatively large to maintain proper guide relation of the follower with the cavity surfaces. A rib 85 is provided rearwardly of point 86 to strengthen the coupler shank and maintain a top guide surface for co-operating with the striker structure.

The torque-supplying mechanism of device 4A just described operates to counterbalance the torque resulting from the moment of the weight of the coupler 5A with respect to its pivotal axis 80 in the variable self-compensating manner described hereinbefore with respect to device 4.

Other media for generating force between the couplers other than the springs 48 and 71 are within the scope of this invention. In addition to cushions of rubber or like material, fluid cylinders with or without external fluid supply and withdrawal systems are available in substitution of those specifically enumerated.

The terms and expressions which have been employed are used as terms of description and not of limitation

What is claimed is:

1. A transitional coupling device for railway vehicles comprising: a pair of unlike couplers having end portions in overlapping relationship; means pivotally connecting said end portions with respect to a normally horizontal axis disposing the couplers in tandem arrangement; one of said couplers being normally rearward of the other in mounted position on a vehicle and having a normally rearward end portion longitudinally opposite its overlapping end portion comprising means for attaching it to a vehicle, said overlapping end portion of said rear coupler comprising means extending forwardly relative to said axis for coupling with another vehicle; the front coupler having its front end portion comprising a second coupling means and having its rearward overlapping end portion bifurcate to define a recess for receiving the first coupling means when both couplers are in common rectilinear alignment, said front coupler being pivotable about said axis to an angle of alignment relative to the rear coupler to expose the first coupling means; a follower supported by the rear coupler in guide relation therewith for relative movement lengthwise thereof; resilient means carried by the rear coupler between the follower and a stop means defined by the rear coupler; and force-transmitting connecting means pivotally connecting with said follower and pivotally connecting with the front coupler along an axis in parallel spaced relation to said pivotal axis and in lateral relation with a longitudinal plane of the front coupler containing said pivotal axis; said resilient means, follower, and connecting means reacting between the two couplers to urge the couplers from one of said alignments to the other.

2. The device of claim 1 wherein: the rear coupler comprises a hollow shank providing a cavity in which said resilient means and follower are housed; said follower engaging the rear end of the resilient means and the second named axis is located above said longitudinal plane; and said connecting means comprises a tension member.

3. The device of claim 1, wherein: the rear coupler comprises a hollow shank providing a cavity in which the resilient means and follower are housed with the follower engaging the front end of the resilient means; and said second named axis is located underneath the longitudinal plane; and said connecting means comprises a compression member.

4. The device of claim 1 wherein: the follower comprises two trunnions projecting horizontally beyond opposite sides of the first coupler; the front coupler has trunnions projecting from opposite sides thereof in coaxial relation with said second axis; connecting rods of equal length extend along each side of the device in journal-bearing relation with the follower trunnion and the front coupler trunnion on said side.

5. The device of claim 1 wherein: said first coupling means is a hook having an upwardly opening slot; said first axis is spaced rearwardly of the slot; said recess is defined by rearwardly extending shank legs of the front coupler with said hook received therebetween; said legs have coaxial bores along an axis parallel to said pivotal axis in registry with the bottom portion of said slot when the couplers are in said longitudinal alignment; and the device comprises a pin insertable through said bores and slot.

6. The device of claim 5 wherein: said legs terminate rearwardly in convex semi-circular buffing surfaces concentric to said first axis; and the rear coupler has concave abutment surfaces concentric to and engageable with said convex surfaces.

7. The device of claim 5 comprising: means for securing the front coupler in said angled alignment comprising means for receiving and securing said pin transversely across the upper side of the front coupler in superjacent relation with the underside of the hook, a front face of the hook being spaced farther from said pivotal axis than the underside of the rear coupler and hook; and abutment means projecting from the underside of the front coupler for engaging frame-end structure of the vehicle.

References Cited in the file of this patent

UNITED STATES PATENTS

| 1,073,453 | Willison | Sept. 16, 1913 |
| 1,958,316 | Richards | May 8, 1934 |
| 2,200,219 | Reid | May 7, 1940 |
| 2,632,573 | Meyer | Mar. 24, 1953 |
| 2,956,695 | Metzger | Oct. 18, 1960 |

FOREIGN PATENTS

| 489,645 | Canada | Jan. 13, 1953 |
| 551,523 | Germany | June 1, 1932 |